(No Model.)
R. P. FRIST.
MANUFACTURE OF RODS OF PARCHMENTIZED FIBER.
No. 424,876. Patented Apr. 1, 1890.
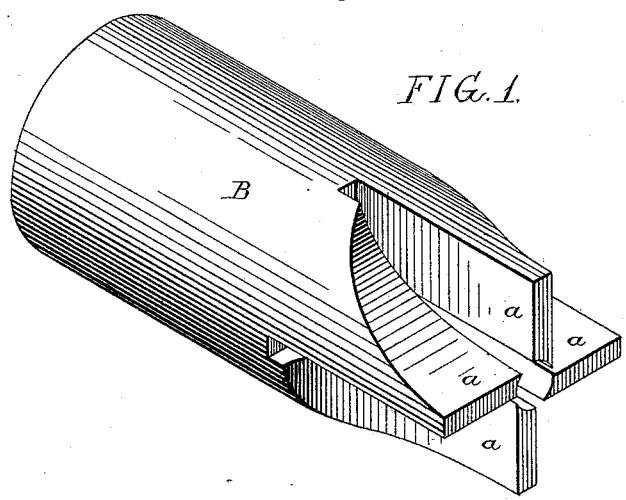
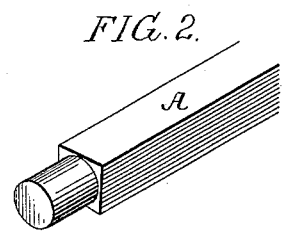
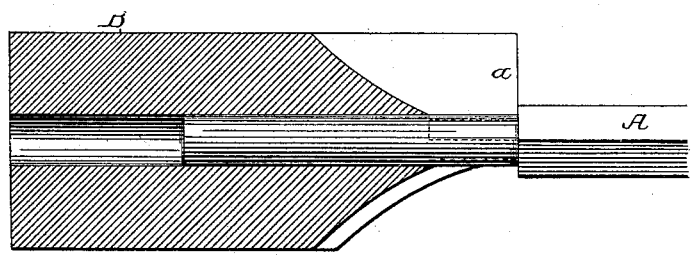
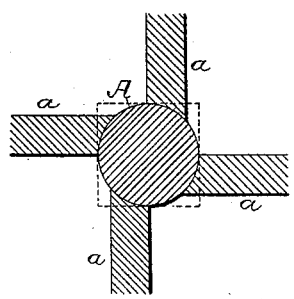
Witnesses:
Inventor:
Robert P. Frist
by his Attorneys
Howson & Howson.

UNITED STATES PATENT OFFICE.

ROBERT P. FRIST, OF WILMINGTON, DELAWARE.

MANUFACTURE OF RODS OF PARCHMENTIZED FIBER.

SPECIFICATION forming part of Letters Patent No. 424,876, dated April 1, 1890.

Application filed February 13, 1890. Serial No. 340,238. (No model.)

*To all whom it may concern:*

Be it known that I, ROBERT P. FRIST, a citizen of the United States, and a resident of Wilmington, New Castle county, Delaware, have invented certain Improvements in the Manufacture of Rods of Parchmentized Fiber, of which the following is a specification.

The object of my invention is to effect the production from parchmentized fiber of perfectly true and cylindrical rods or bars of any desired diameter or length, and this object I attain in the manner hereinafter set forth, reference being had to the accompanying drawings, in which—

Figure 1 is a perspective view of a tool which may be used in carrying out my invention. Fig. 2 is a view of a bar illustrating the manner of carrying out my invention; and Figs. 3 and 4 are sectional views showing the action of the tool, Fig. 1, upon the bar.

My invention is intended for making cylindrical bars or rods of that class of chemically-treated fibrous material known in the market under the various names of "vulcanized fiber," "kartavert," "parchment paper," "leatheroid," &c., and which may be grouped under the general term of "parchmentized fiber."

Hitherto much difficulty has been experienced in making perfectly true cylindrical rods or bars of such material, for the material cannot be turned in a lathe, as it will spring under the pressure of the turning-tool, and thus prevent the production of a true cylinder. Attempts have, therefore, been made to produce the rods by first making a rod or bar of square, hexagonal, octagonal, or other polygonal form, and then subjecting the same to the action of rollers which reduce it to cylindrical form; but this method of pressing the rods has been found to be ineffective, as the rod is of varying density, and has a tendency to return to a shape approximating its original polygonal form.

In carrying out my invention, therefore, I first produce a rod or bar A, of square or other polygonal cross-section, approximating that of the cross-section of the desired cylindrical rod or bar to be produced, and I then cut off the projecting corners or angular portions of the bar, by means of cutting blades or tools acting at points equidistant from each other around the circumference of the bar, the cutting operation beginning at one end of the bar and advancing progressively along the bar from one end to the other.

A tool which may be used in carrying out my invention is that shown in Fig. 1, said tool consisting of a hollow stem or mandrel B, reduced at the front end so as to form four cutting-blades $a$, located equidistant from each other around the axis of the tool, the inner faces of these blades being concave, so that when the tool acts upon the end of the rod A to reduce the same to cylindrical form, said cylindrical portion will fit snugly to and will be firmly supported at equidistant points by the curved inner faces of the cutting-bits $a$, as shown in Fig. 4, thus preventing any deflection of the rod or bar which is being acted on, and insuring the absolute truth of the cylinder thus produced. A rod or bar of any desired length can be produced, the rod passing completely through the mandrel, which has a cylindrical bore extending from end to end, as shown in Fig. 3.

Having thus described my invention, I claim and desire to secure by Letters Patent—

The mode herein described of producing cylindrical rods or bars of parchmentized fibrous material, said mode consisting in first producing a bar of square or other polygonal form, and of a size approximating that of the desired cylindrical rod and then removing the projecting corners or angular portions of this bar by means of cutting-tools equidistantly disposed around the circumference of the cylinder which is being formed, the cutting operation commencing at one end of the bar and continuing progressively along said bar, substantially as specified.

In testimony whereof I have signed my name to this specification in the presence of two subscribing witnesses.

ROBERT P. FRIST.

Witnesses:
H. E. FRIST,
FRANK S. BRANT.